US010460275B2

(12) United States Patent
Altshuller et al.

(10) Patent No.: US 10,460,275 B2
(45) Date of Patent: Oct. 29, 2019

(54) PREDICTIVE MODEL SEARCH BY COMMUNICATING COMPARATIVE STRENGTH

(71) Applicant: International Business Machines Corporation, Armonk, NY (US)

(72) Inventors: Marc Altshuller, Toronto (CA);
Jing-Yun Shyr, Naperville, IL (US);
Damir Spisic, Chicago, IL (US);
Margaret J. Vais, Chicago, IL (US);
Neil Whitney, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 14/633,494

(22) Filed: Feb. 27, 2015

(65) Prior Publication Data

US 2016/0253324 A1   Sep. 1, 2016

(51) Int. Cl.
*G06Q 10/06* (2012.01)
*G06Q 30/02* (2012.01)

(52) U.S. Cl.
CPC .......... *G06Q 10/067* (2013.01); *G06Q 30/02* (2013.01)

(58) Field of Classification Search
None
See application file for complete search history.

(56) References Cited

U.S. PATENT DOCUMENTS 7,418,674 B2   8/2008 Robbins
7,889,914 B2   2/2011 Regli et al.
8,005,812 B1   8/2011 Mosterman et al.
8,185,486 B2   5/2012 Eder
8,832,017 B2   9/2014 Adams et al.
(Continued)

FOREIGN PATENT DOCUMENTS

CN   102073713 A   5/2011

OTHER PUBLICATIONS

Draper, Geoffrey M., Livnat, Yarden, Riesenfeld, Richard F., A Survey of Radial Methods for Information Visualization, Sep. 2009, IEEE Transactions on Visualization and Computer Graphics, vol. 15 No. 5, pp. 759-776.*

(Continued)

*Primary Examiner* — Mark D Featherstone
*Assistant Examiner* — Ranjit P Doraiswamy
(74) *Attorney, Agent, or Firm* — Erik K. Johnson

(57) ABSTRACT

A method for comparing predictive data models based on a predictive model search is provided. The method may include receiving a first and second portion of a set of data. The method may also include identifying a first and second variation of the second portion, wherein the first variation is different from the second variation. The method may further include generating first predictive data models based on the first variation, and second predictive data models based on the second variation. Additionally, the method may include applying a criteria to rank the first and second predictive data models based on predictive strength. The method may also include presenting a display of the ranked criteria, comprising the first portion, and a portion of the first and second predictive data models, wherein the portion of the first and second predictive data models are collectively ranked and presented according to the predictive strength.

10 Claims, 4 Drawing Sheets

(56) References Cited

U.S. PATENT DOCUMENTS

| | | | |
|---|---|---|---|
| 2004/0172374 A1 | 9/2004 | Forman | |
| 2005/0234760 A1 | 10/2005 | Pinto et al. | |
| 2007/0120856 A1 | 5/2007 | De Ruyter et al. | |
| 2011/0106723 A1* | 5/2011 | Chipley | G06Q 10/06 705/348 |
| 2013/0151311 A1* | 6/2013 | Smallwood | G06Q 30/0202 705/7.31 |
| 2013/0332232 A1 | 12/2013 | Agrawal et al. | |
| 2014/0156568 A1* | 6/2014 | Ganguly | G06Q 10/0637 706/12 |
| 2014/0250051 A1 | 9/2014 | Lahav et al. | |
| 2014/0336788 A1* | 11/2014 | Paunonen | G05B 13/04 700/29 |
| 2015/0339572 A1* | 11/2015 | Achin | G06N 5/02 706/46 |

OTHER PUBLICATIONS

IBM, "List of IBM Patents or Patent Applications Treated as Related (Appendix P)," Apr. 29, 2016, p. 1-2.

Altshuller et al., "Predictive Model Search by Communicating Comparative Strength," Application and Drawings, Filed on Mar. 22, 2016, 25 Pages, U.S. Appl. No. 15/077,096.

Anonymous, "A Method and System for Verifying Predictive Model Outputs," An IP.com Prior Art Database Technical Disclosure, Apr. 7, 2010, p. 1, IP.com No. 000194685.

Burnham et al., "AIC model selection and multimodel inference in behavioral ecology: some background, observations, and comparisons," Behavioral Ecology and Sociobiology, Jan. 2011, p. 23-35, vol. 65, Issue 1, © Springer-Verlag 2010.

Draper et al., "A Survey of Radial Methods for Information Visualization," IEEE Transactions on Visualization and Computer Graphics, Sep./Oct. 2009, p. 759-776, vol. 15, No. 5, IEEE Computer Society.

IBM, "Hit the Bullseye with Watson Analytics," IBM News Room—Image Gallery, Sep. 16, 2014, https://www-03.ibm.com/press/us/en/photo/44846.wss, Accessed on Feb. 27, 2015, Grace Period Disclosure.

IBM, "IBM Introduces Powerful Analytics for Everyone," IBM News Room—News Release, Sep. 16, 2014, p. 1-4, https://www-03.ibm.com/press/us/en/pressrelease/44843.wss#release, Accessed on Feb. 27, 2015, Grace Period Disclosure.

Patel et al., "Using Multiple Models to Understand Data," Proceedings of the Twenty-Second International Joint Conference on Artificial Intelligence, Jul. 16-22, 2011, p. 1723-1728, IJCAI, Barcelona, Catalonia, Spain.

* cited by examiner

PREDICTIVE MODEL SEARCH BY COMMUNICATING COMPARATIVE STRENGTH

Aspects of the present invention have been disclosed by the Applicant, who obtained the subject matter disclosed directly from the inventors, in the product IBM Watson Analytics, made available to the public on Sep. 16, 2014.

BACKGROUND

The present invention relates generally to the field of computing, and more specifically, to generating and comparing predictive strengths of predictive data models.

Business analysts generally analyze large volumes of data, resulting in a multitude of predictive data models that may be created to help understand or effectuate a target. For example, a common business target is to increase sales. Predictors, such as customer demographics, purchase history, salesperson experience and compensation, may be used to predict those sales. There are some available methods for generating multiple models based on a given set of data, and other methods for assessing their predictive strength. A linear or generalized linear model may, for example, be developed where predictors can be added or removed one at a time. Such methods may create a number of models of varying sizes, and their focus may be to provide for an optimal or most accurate model using all available predictors. For example, current model predictor selection methods may search for an optimal model by creating a sequence of models leading to the optimal model. Therefore, the number of possible models generally grows exponentially with the number of predictors.

SUMMARY

A method for comparing a plurality of predictive data models based on a predictive model search is provided. The method may include receiving a first portion and a second portion of a set of data. The method may also include identifying a first variation of the second portion and a second variation of the second portion, wherein the first variation is different from the second variation. The method may further include generating a plurality of first predictive data models based on the first variation. Additionally, the method may include generating a plurality of second predictive data models based on the second variation. The method may also include applying a criteria to rank the plurality of first predictive data models and the plurality of second predictive data models based on a predictive strength. The method may further include presenting a display of the ranked criteria, comprising the first portion, and a portion of the plurality of first predictive data models and the plurality of second predictive data models, wherein the portion of the plurality of first predictive data models and the plurality of second predictive data models are collectively ranked and presented on the display according to the predictive strength.

A computer system for comparing a plurality of predictive data models based on a predictive model search is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a first portion and a second portion of a set of data. The method may also include identifying a first variation of the second portion and a second variation of the second portion, wherein the first variation is different from the second variation. The method may further include generating a plurality of first predictive data models based on the first variation. Additionally, the method may include generating a plurality of second predictive data models based on the second variation. The method may also include applying a criteria to rank the plurality of first predictive data models and the plurality of second predictive data models based on a predictive strength. The method may further include presenting a display of the ranked criteria, comprising the first portion, and a portion of the plurality of first predictive data models and the plurality of second predictive data models, wherein the portion of the plurality of first predictive data models and the plurality of second predictive data models are collectively ranked and presented on the display according to the predictive strength.

A computer program product for comparing a plurality of predictive data models based on a predictive model search is provided. The computer program product may include one or more computer-readable storage devices and program instructions stored on at least one of the one or more tangible storage devices, the program instructions executable by a processor. The computer program product may include program instructions to receive a first portion and a second portion of a set of data. The computer program product may also include program instructions to identify a first variation of the second portion and a second variation of the second portion, wherein the first variation is different from the second variation. The computer program product may further include program instructions to generate a plurality of first predictive data models based on the first variation. Additionally, the computer program product may include program instructions to generate a plurality of second predictive data models based on the second variation. The computer program product may also include program instructions to apply a criteria to rank the plurality of first predictive data models and the plurality of second predictive data models based on a predictive strength. The computer program product may further include program instructions to present a display of the ranked criteria, comprising the first portion, and a portion of the plurality of first predictive data models and the plurality of second predictive data models, wherein the portion of the plurality of first predictive data models and the plurality of second predictive data models are collectively ranked and presented on the display according to the predictive strength.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
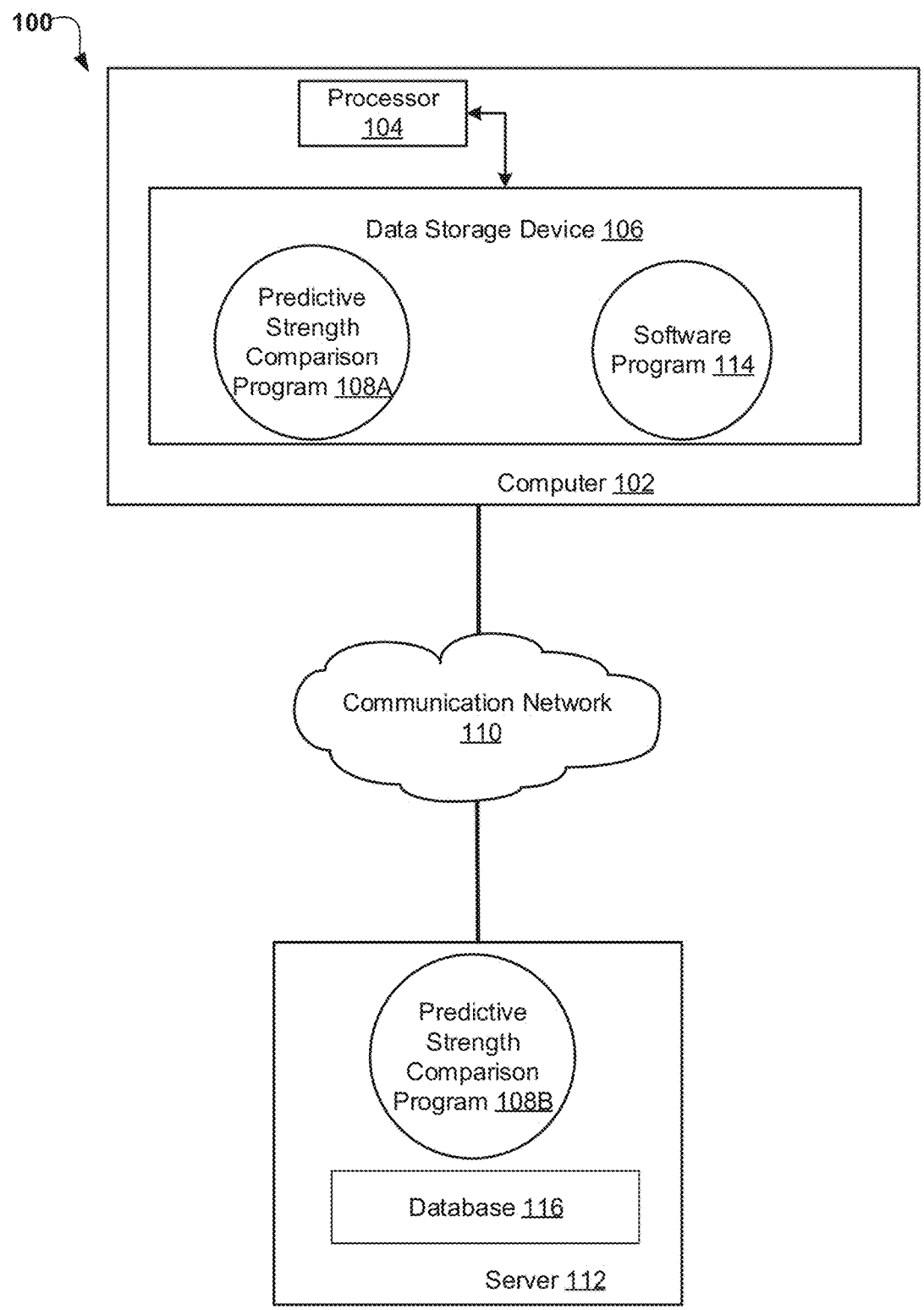
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to generating and comparing the predictive strengths of predictive data models. The following described exemplary embodiments provide a system, method and program product for generating and comparing the predictive strengths of predictive data models based on multiple predictors. Additionally, the present embodiment has the capacity to improve the technical field of data analyzing associated with a predictive model search by presenting the predictive strength of predictive data models, which may differ in model type and number of predictors, in a spiral visualization chart.

As previously described with respect to data analyzing, several predictive data models may be created to help understand and effectuate a given target. With respect to the previous example, a business target may include increasing sales. Thus, a multivariate predictive data model may be developed to arrive at a solution to increase sales. Furthermore, predictors, such as customer demographics and purchase history, may be used in the predictive data models. Current methods may, in turn, generate optimal, or the most accurate, predictive data models by using all available predictors, and may create a sequence of models leading to the optimal predictive data models. However, analysts may not be exclusively interested in the most accurate predictive data models. A more suitable method may include a quick scan over a multitude of predictive data models, and identifying ones containing predictors that could be manipulated in business practices while providing a satisfactory level of accuracy. For example, a predictive data model with five predictor variables may be 80% accurate, but a single predictor may account for 70% of the variability. Thus, while current methods may be capable of creating the most accurate predictive data models, they do not provide for nor compare expanded views of predictive data models that are possibly somewhat less accurate but that satisfy constraints encountered in business practices. Therefore, a challenge may be to provide a comparison of the models to determine which predictive data models are potentially useful. As such, it may be advantageous, among other things, to generate and compare the predictive strengths of several predictive data models based on multiple predictors.

According to at least one embodiment of the present invention, predictive strengths of several predictive data models may be compared. In one embodiment, given a set of data and a target of interest, a single measure may be used to compare predictive strengths across several predictive data models, which may differ in model type and number of predictors. According to one implementation, the predictive data models may vary in model type by shape and/or color to distinguish the content and complexity of each predictive data model. Furthermore, according to one implementation, the predictive data models used for comparison may be selected according to a proposed models search criteria. Then, according to one implementation, the predictive data models may be placed on a chart, where the predictive data models with stronger predictive strengths are presented closer to the target.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating and comparing the predictive strengths of predictive data models based on multiple predictors.

According to at least one implementation, predictive data, with predictor variables and a specified target, may be read to create predictive data models. Also, optimal predictive data models may be generated using one or more predictive modeling methods. Furthermore, the types of predictive data models may be represented by shape and/or color, and the complexity within the predictive models may be represented by the complexity of the shape. Additionally, the predictive data models may be compared according to proposed predictive data model search criteria. Thereafter, based on the predictive data model search criteria, a set of the top predictive data models that satisfy the criteria may be produced. For example, a set of predictive data models with a certain number of predictors, or with their number of predictors in a given range, may be compared. Furthermore, a measure may be used to compare and rank the predictive strengths of the selected predictive data models. A spiral chart may also be generated to display the predictive data models according to their predictive strengths. The predictive data models may further be manipulated to determine if adding or removing predictors are beneficial to the target. As such, embodiments of the present invention may not only generate optimal predictive data models, but may also generate and compare the predictive strengths of several predictive data models based on multiple predictors.

Referring now to FIG. 1, an exemplary networked computer environment 100 in accordance with one embodiment is depicted. The networked computer environment 100 may include a computer 102 with a processor 104 and a data storage device 106 that is enabled to run a predictive strength comparison program 108A and a software program 114. The software program 114 may be an application program such as an internet browser and an email program. The predictive strength comparison program 108A may communicate with the software program 114. The networked computer environment 100 may also include a server 112 that is enabled to run a predictive strength comparison program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a predictive strength comparison program 108A and 108B may run on the client computer 102 or on the server computer 112. The predictive strength comparison program 108A, 108B may read a given set of data, produce predictive data models based on the given set of data, and compare and display a predictive strength of each predictive data model produced. For example, a user using a computer, such as computer 102, may access the predictive strength comparison program 108A, 108B, or may use a software application program 114 that interacts with the predictive strength comparison program 108A, 108B, and a database 116, to receive a given set of data inputted by the user, produce predictive data models based on the set of data, and compare and display the predictive strengths of each predictive data model. The predictive strength comparison program method is explained in further detail below with respect to FIGS. 2 and 3.

Figure 2:
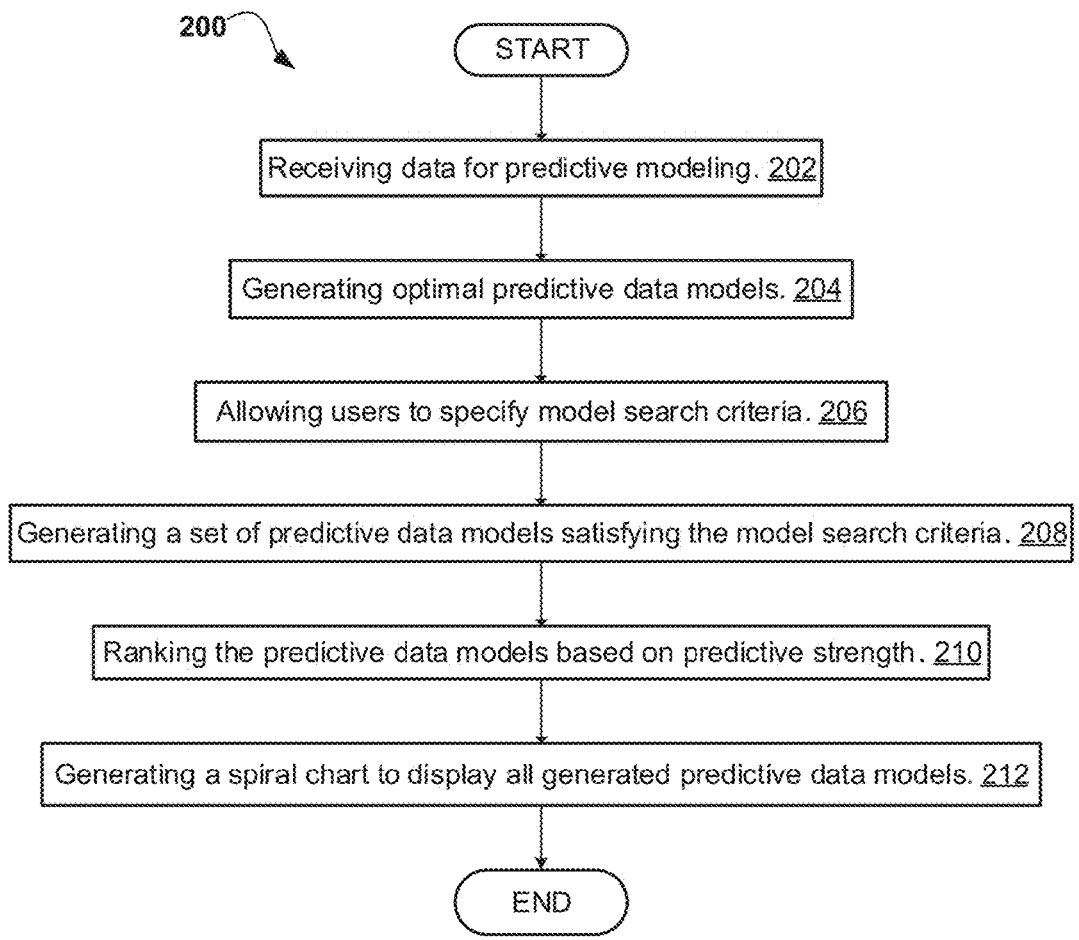
FIG. 2 is an operational flowchart illustrating the steps carried out by a program for generating and comparing the predictive strengths of predictive data models based on multiple predictors.

Referring now to FIG. 2, an operational flowchart 200 illustrates the steps carried out by a program for generating and comparing the predictive strengths of predictive data models based on multiple predictors. As previously described, the predictive strength comparison program 108A, 108B (FIG. 1) may be implemented as running on a client computer 102 (FIG. 1) or server computer 112 (FIG. 1). According to at least one embodiment, the program may generate a comparative strength of predictive data models based on multiple predictors. The implementation for the steps in generating and comparing the predictive strengths of predictive data models are described in more detail below.

At 202, the predictive strength comparison program 108A, 108B (FIG. 1) may receive data for predictive modeling. The data received by the predictive strength comparison program 108A, 108B (FIG. 1) may be data inputted from a user. Furthermore, the inputted data may be a specified target and a plurality of predictor variables. Additionally, one or more predictor variables may be used to form predictive data models. For example, a user may want to learn what influences or predicts a purchase made of a particular product. Therefore, the user may use a client computer 102 (FIG. 1) to access the predictive strength comparison program 108A, 108B (FIG. 1), or to access a software application program 114 (FIG. 1) having the predictive strength comparison program 108A, 108B (FIG. 1), and thereafter, to input "purchase made" as a specified target. The predictive strength comparison program 108A, 108B (FIG. 1) may also allow the user to input predictor variables such as, "product category", "gender", "discount" and "region" to form one or more predictive data models.

Then, the predictive strength comparison program 108A, 108B (FIG. 1) may receive the data inputted by the user for predictive modeling.

Next, at 204, the predictive strength comparison program 108A, 108B (FIG. 1) may generate optimal predictive data models. More specifically, the optimal predictive data models may be predictive data models having the strongest predictive strength, based on one or more predictive modeling methods that may measure the predictive accountability of a predictive data model for a specified target. Therefore, according to at least one implementation of the present embodiment, the predictive strength comparison program 108A, 108B (FIG. 1) may generate sets of optimal predictive data models for one or more predictive modeling methods. Furthermore, when generating the optimal predictive data models, the predictive strength comparison program 108A, 108B (FIG. 1) may receive each of the predictor variables inputted by the user, and may generate optimal predictive data models that differ in the amount of predictor variables used. For example, the predictive strength comparison program 108A, 108B (FIG. 1) may use one or more predictive modeling methods to generate: optimal predictive data models having 1 predictor variable, optimal predictive data models having 2 predictor variables, optimal predictive data models having 3 predictor variables, and up to 4 or even more predictor variables depending on the amount of predictor variables inputted.

As such, with respect to the previous example, the predictive strength comparison program 108A, 108B (FIG. 1) may use one or more predictive modeling methods to generate optimal predictive data models for the specified target "purchase made", and using the inputted predictor variables "product category", "gender", "discount" and "region". Thus, the predictive strength comparison program 108A, 108B (FIG. 1) may use one or more predictive modeling methods to generate optimal predictive data models having 3 predictor variables, such as "product category", "gender", and "discount". Concurrently, one or more optimal predictive data models may be generated having 2 predictor variables, such as "product category" and "discount".

Furthermore, the predictive strength comparison program 108A, 108B (FIG. 1) may generate optimal predictive data models having not only a different amount of predictor variables, but also different combinations of predictor variables as well. For example, based on one or more predictive modeling methods, an optimal predictive data model may be generated for the specified target "purchase made", and having 2 predictor variables, "gender" and "region", which may be the optimal predictive data model having 2 predictor variables for a given predictive modeling method. Concurrently, based on one or more other predictive modeling methods, an optimal predictive data model may be generated for the specified target "purchase made", and having 2 predictor variables, "gender" and "discount", which may be the optimal predictive data model having 2 predictor variables according to one or more other predictive modeling methods. As such, the predictive strength comparison program 108A, 108B (FIG. 1) may generate optimal predictive data models, having the strongest predictive strength according to one or more predictive modeling methods, and varying in size according to the amount and different combinations of predictor variables inputted by the user.

Then, at 206, the predictive strength comparison program 108A, 108B (FIG. 1) may allow users to specify a model search criteria. As previously described, predictive data models may vary in size based on the amount of predictor variables and the different combinations of predictor variables used. Additionally, the predictive strength comparison program 108A, 108B (FIG. 1) may allow a user to specify the amount of predictor variables and different combinations of predictor variables used for generating predictive data models. According to at least one implementation in the present embodiment, the predictive strength comparison program 108A, 108B (FIG. 1) may allow a user to specify a model search criteria by: specifying which predictor variables may be used in generating predictive data models, specifying an amount and range of predictor variables to be used in generating predictive data models, and/or specifying the predictive strength comparison program 108A, 108B (FIG. 1) to generate sub-models of an optimal predictive data model with a given number of predictor variables.

For example, the predictive strength comparison program 108A, 108B (FIG. 1) may allow a user to input a specified target and 10 different predictor variables. Then, the predictive strength comparison program 108A, 108B (FIG. 1) may use one or more predictive modeling methods to generate optimal predictive data models. Thereafter, or alternatively, the predictive strength comparison program 108A, 108B (FIG. 1) may allow the user to specify a model search criteria, such as: generate predictive data models having 4 predictor variables; generate predictive data models having between 5 and 10 predictor variables; generate predictive data models having predictor variables 1, 6, 7, and 9 in each predictive data model; and/or generate predictive data models with at most 10 predictor variables that are part of optimal predictive data models. Therefore, the predictive strength comparison program 108A, 108B (FIG. 1) may allow a user to specify the number of predictor variables and the different combinations used for producing predictive data models.

Next, at 208, the predictive strength comparison program 108A, 108B (FIG. 1) may generate a set of the top-N predictive data models that satisfy the model search criteria. As previously described at step 206, the predictive strength comparison program 108A, 108B (FIG. 1) may allow users to specify a model search criteria. Thereafter, the predictive strength comparison program 108A, 108B (FIG. 1) may generate a set of the top-N predictive data models based on the model search criteria inputted by the user. For example, when inputting 10 predictor variables, the user may specify the predictive strength comparison program 108A, 108B (FIG. 1) to generate the top 5 predictive data models having 1 predictor variable and the top 5 predictor variables having 2 predictor variables for the specified target "purchase made". As such, the predictive strength comparison program 108A, 108B (FIG. 1) may generate a set of those top 5 predictive data models, wherein one or more predictive data models may, for example, have a single predictor variable 4, a set of predictor variables 1 and 3, a set of predictor variables 4 and 6, and a single predictor variable 10.

Then, at 210, the predictive strength comparison program 108A, 108B (FIG. 1) may rank the predictive data models based on their predictive strength. As previously described at step 204, the predictive strength comparison program 108A, 108B (FIG. 1) may use one or more predictive modeling methods to generate optimal predictive data models. Also, as previously described at steps 206 and 208, the predictive strength comparison program 108A, 108B (FIG. 1) may allow a user to specify a model search criteria and generate the top-N predictive data models satisfying the model search criteria. As such, at 210, the predictive strength comparison program 108A, 108B (FIG. 1) may rank each predictive data model generated based on their predictive strength according to one or more predictive strength ranking methods. For example, the predictive strength comparison program 108A, 108B (FIG. 1) may generate multiple optimal predictive data models, a set of the top-N predictive data models having 1 predictor variable, and a set of the top-N predictive data models having 2 predictor variables. Then, the predictive strength comparison program 108A, 108B (FIG. 1) may rank each of the generated predictive data models based on their predictive strength, according to one or more predictive strength ranking methods, that may measure the predictive accountability of each predictive data model.

Next, at 212, the predictive strength comparison program 108A, 108B (FIG. 1) may generate a spiral visualization chart displaying all generated predictive data models based on their predictive strength. As previously described at step 210, the predictive strength comparison program 108A, 108B (FIG. 1) may rank each generated predictive data model based on their predictive strength. Thereafter, the predictive strength comparison program 108A, 108B (FIG. 1) may display each predictive data model on a spiral visualization chart based on their predictive strength. For example, the predictive strength comparison program 108A, 108B (FIG. 1) may generate and rank optimal predictive data models, a set of the top-N predictive data models having 1 predictor variable, and a set of the top-N predictive data models having 2 predictor variables. Furthermore, the predictive strength comparison program 108A, 108B (FIG. 1) may compare each generated predictive data model by displaying a spiral visualization chart having the specified target at the center of the spiral visualization chart, and having the various predictive data models spiraling out from the center. Additionally, the predictive strength comparison program 108A, 108B (FIG. 1) may compare and display in the spiral visualization chart all generated predictive data models, the optimal predictive data models, and/or predictive data models from the latest model search criteria.

It may be appreciated that FIG. 2 provides only an illustration of one implementation and does not imply any limitations with regard to how different embodiments may be implemented. Many modifications to the depicted environments may be made based on design and implementation requirements. For example, the predictive strength comparison program 108A, 108B (FIG. 1) may generate optimal predictive data models first to establish and provide guidance for the model search criteria, or alternatively, allow a user to initially specify a model search criteria when inputting the specified target and predictor variables.

Figure 3:
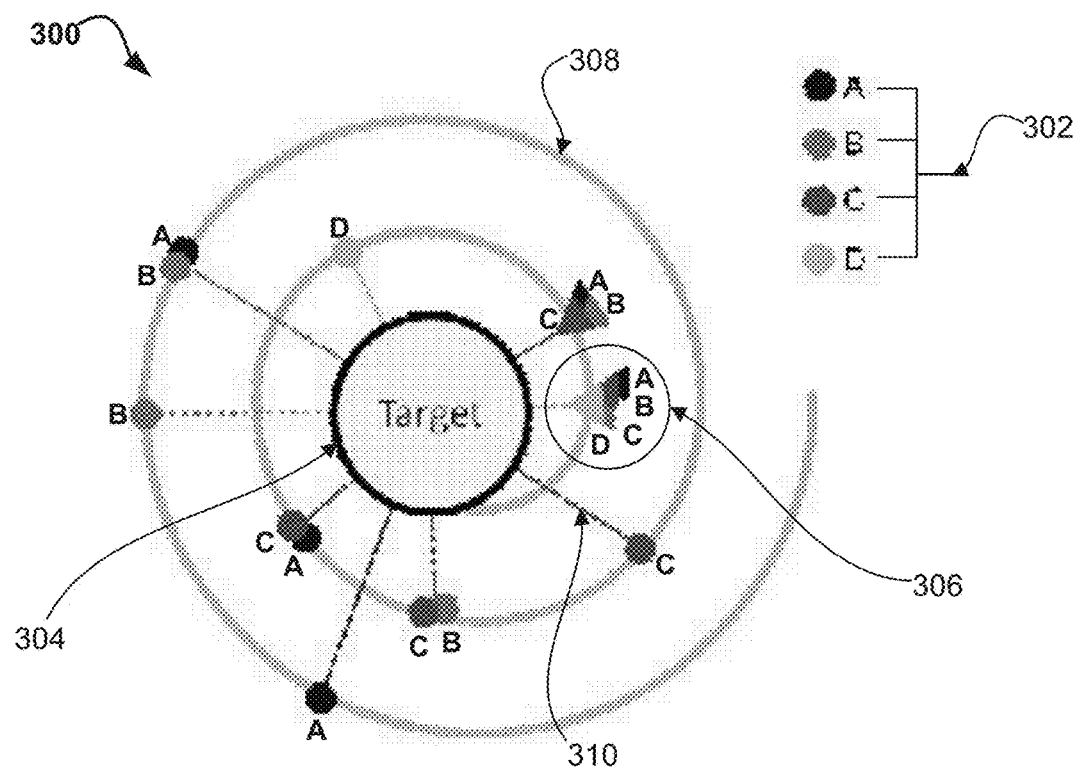
FIG. 3 illustrates an example of a spiral visualization chart displaying predictive data models according to at least one embodiment.

Referring now to FIG. 3, an example of a spiral chart displaying predictive data models according to at least one embodiment is depicted. According to at least one implementation of the present embodiment, predictive data models may be compared by their predictive strength and displayed on a spiral visualization chart 300. As previously described in FIG. 2, a user may initiate a predictive strength comparison by inputting a specified target and predictor variables. Therefore, in FIG. 3, a spiral visualization chart may include predictor variables 302, which form predictive data models 306, for a specified target 304. The spiral visualization chart 300 may have the specified target 304 in the center, and a spiral 308 spiraling out from the specified target 304. The generated predictive data models 306 may be located on the spiral 308, and may be ordered by their predictive strength. As such, the predictive strength comparison program 108A, 108B (FIG. 1) may compare each predictive data model 306 according to their predictive strength by the angle and position from the specified target 304, wherein the predictive data models 306 closer to the specified target 304 may represent a higher predictive strength. Furthermore, each predictive data model 306 may be connected to the specified target 304 by a connecting line 310.

Thus, the predictive strength comparison program 108A, 108B (FIG. 1) may allow users to identify the predictive strength of each predictive data model 306 by their location on the spiral 308, and the length of their connecting line 310. For example, according to one implementation of the present invention, a predictive data model 306 having all inputted predictor variables 302, may represent the predictive data model 306 with the highest predictive strength. As such, the predictive data model 306 having all inputted predictor variables 302 may be the predictive data model 306 on the spiral 308 closest to the specified target 304, and may also have the shortest connecting line 310. Furthermore, other predictive data models 306 may be represented on the spiral chart 300, wherein the further away each predictive data model 306 may be from the specified target 304, the lesser their predictive strength when compared to predictive data models 306 closer to the specified target 304. Thus, even a predictive data model 306 having a single predictor variable "D", as shown in FIG. 3, may be closer to the specified target 304 than a predictive data model 306 having 2 predictor variables "A" and "C", because the predictive data model 306 having the single predictor variable "D" may have a greater predictive strength. Additionally, the type of predictive data model 306, and complexity of each predictive data model 306, may be represented by shape and/or color.

Figure 4:
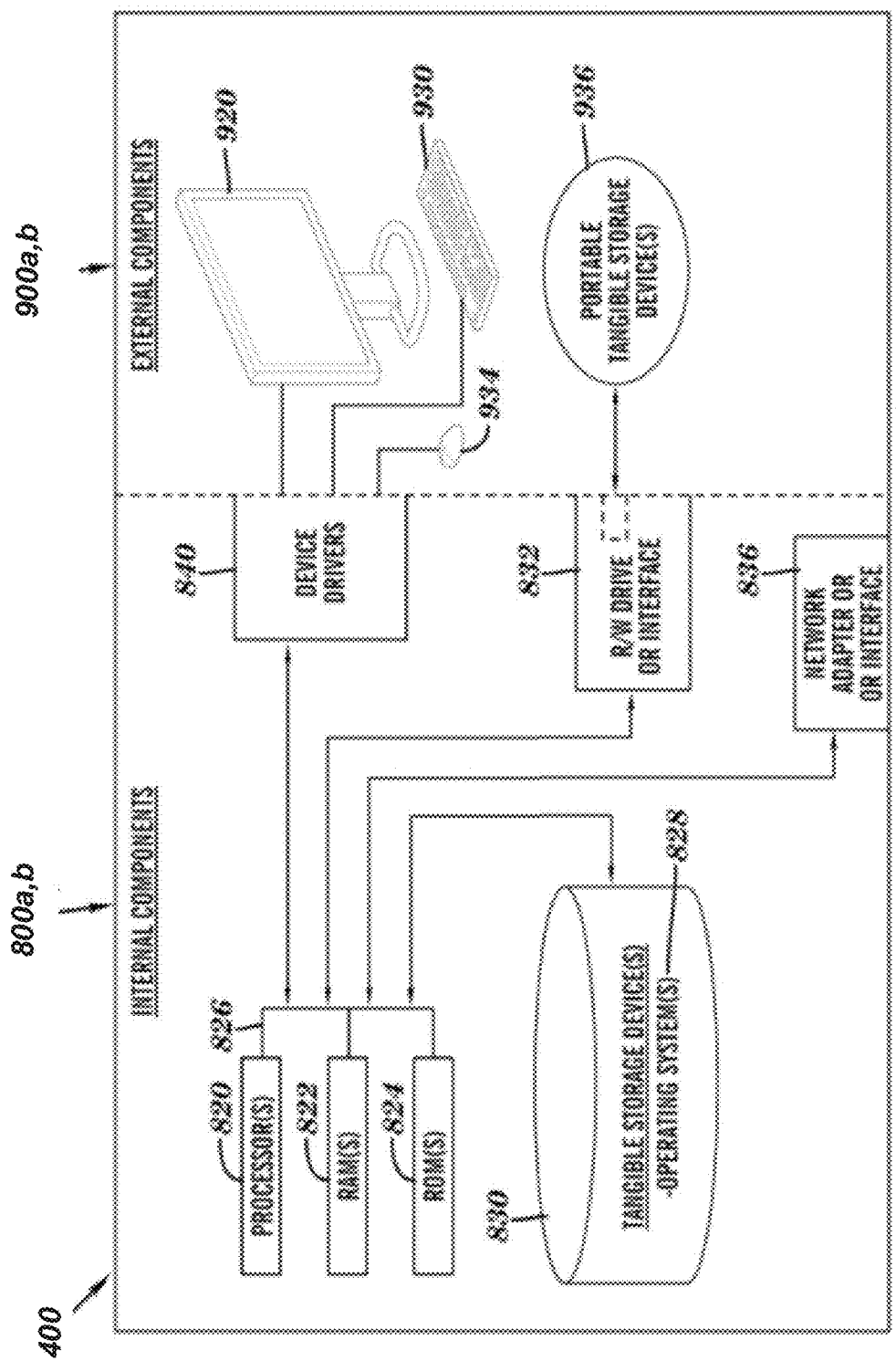
FIG. 4 is a block diagram of internal and external components of computers and servers depicted in FIG. 1 according to at least one embodiment.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the predictive strength comparison program 108A (FIG. 1) in client computer 102 (FIG. 1), and the predictive strength comparison program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as predictive strength comparison program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The predictive strength comparison program 108A (FIG. 1) and software program 114 (FIG. 1) in client computer 102 (FIG. 1), and predictive strength comparison program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the predictive strength comparison program 108A (FIG. 1) and software program 114 (FIG. 1) in client computer 102 (FIG. 1) and the predictive strength comparison program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating a plurality of predictive data models based on a predictive model search, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving a first portion, wherein the first portion comprises a specified target;

receiving a second portion, wherein the second portion comprises a plurality of predictor variables;

based on the received second portion, receiving a model search criterion for simultaneously generating the plurality of predictive data models, wherein the model search criterion is based on a combination of different user selections each for generating different predictive data models and wherein the combination comprises a first user selection including a selected number of one or more predictor variables to use to generate the plurality of predictive data models, a second user selection of a specified range of the one or more predictor variables to use to generate the plurality of predictive data models, and a third user selection specifying which of the one or more predictor variables to use to generate the plurality of predictive data models;

processing user input to simultaneously generate a first specified number of the plurality of predictive data models based on the first user selection, a second specified number of the plurality of predictive data models based on the second user selection, and a third specified number of the plurality of predictive data models based on the third user selection;

simultaneously generating the plurality of predictive data models based on the processed user input and the received model search criterion, wherein the plurality of predictive data models comprises a first variation of the plurality of predictive data models based on the first user selection, a second variation of the plurality of predictive data models based on the second user selection, and a third variation of the plurality of predictive data models based on the third user selection;

applying a criteria to rank the generated plurality of predictive data models based on a predictive strength; and presenting a spiral chart display of the ranked criteria, wherein the spiral chart display simultaneously comprises the first variation of the plurality of predictive data models based on the first user selection, the second variation of the plurality of predictive data models based on the second user selection, and the third variation of the plurality of predictive data models based on the third user selection, and wherein the first variation, the second variation, and the third variation are collectively ranked and presented on the spiral chart display according to the predictive strength.

2. The computer system of claim 1, wherein the generating of the first variation, the second variation, and the third variation is based on a group comprising a plurality of predictive modeling methods and a plurality of model search criterion.

3. The computer system of claim 2, wherein the model search criterion is based on a plurality of user actions, and wherein the plurality of user actions is selected from a group comprising: specifying a set of predictor variables, specifying an amount of predictor variables, specifying a range of predictor variables, and specifying instructions to identify sub-models of the plurality of predictive data models.

4. The computer system of claim 1, wherein the generating the plurality of predictive data models is based on a predictive strength of predictive data models.

5. The computer system of claim 1, wherein the criteria ranks the plurality of predictive data models according to the predictive strength.

6. The computer system of claim 1, wherein the display of the ranked criteria is a spiral visualization chart, comprising the first portion, a spiral, and the plurality of predictive data models positioned on the spiral, and wherein the predictive strength of the plurality of predictive data models is presented according to a position from the first portion.

7. A computer program product for generating a plurality of predictive data models based on a predictive model search, comprising:

one or more computer-readable storage devices and program instructions stored on at least one of the one or more tangible storage devices, the program instructions executable by a processor, the program instructions comprising:

program instructions to receive a first portion, wherein the first portion comprises a specified target;

programs instructions to receive a second portion, wherein the second portion comprises a plurality of predictor variables;

program instructions to, based on the received second portion, receive a model search criterion for simultaneously generating the plurality of predictive data models, wherein the model search criterion is based on a combination of different user selections each for generating different predictive data models and wherein the combination comprises a first user selection including a selected number of one or more predictor variables to use to generate the plurality of predictive data models, a second user selection of a specified range of the one or more predictor variables to use to generate the plurality of predictive data models, and a third user selection specifying which of the one or more predictor variables to use to generate the plurality of predictive data models;

program instructions to process user input to simultaneously generate a first specified number of the plurality of predictive data models based on the first user selection, a second specified number of the plurality of predictive data models based on the second user selection, and a third specified number of the plurality of predictive data models based on the third user selection;

program instructions to simultaneously generate the plurality of predictive data models based on the processed user input and the received model search criterion, wherein the plurality of predictive data models comprises a first variation of the plurality of predictive data models based on the first user selection, a second variation of the plurality of predictive data models based on the second user selection, and a third variation of the plurality of predictive data models based on the third user selection;

program instructions to apply a criteria to rank the generated plurality of predictive data models based on a predictive strength; and program instructions to present a spiral chart display of the ranked criteria, wherein the spiral chart display simultaneously comprises the first variation of the plurality of predictive data models based on the first user selection, the second variation of the plurality of predictive data models based on the second user selection, and the third variation of the plurality of predictive data models based on the third user selection, and wherein the first variation, the second variation, and the third variation are collectively ranked and presented on the spiral chart display according to the predictive strength.

8. The computer program product of claim 7, wherein the model search criterion is based on a plurality of user actions, and wherein the plurality of user actions is selected from a group comprising: specifying a set of predictor variables, specifying an amount of predictor variables, specifying a range of predictor variables, and specifying instructions to identify sub-models of the plurality of predictive data models.

9. The computer program product of claim 7, wherein the program instructions to generate the plurality of predictive data models is based on a predictive strength of predictive data models.

10. The computer program product of claim 7, wherein the display of the ranked criteria is a spiral visualization chart, comprising the first portion, a spiral, and the plurality of predictive data models positioned on the spiral, and wherein the predictive strength of the plurality of predictive data models is presented according to a position from the first portion.

* * * * *